April 1, 1952 L. D. COBB 2,590,939
SEPARATOR FOR ANTIFRICTION BEARINGS
Filed Sept. 3, 1949
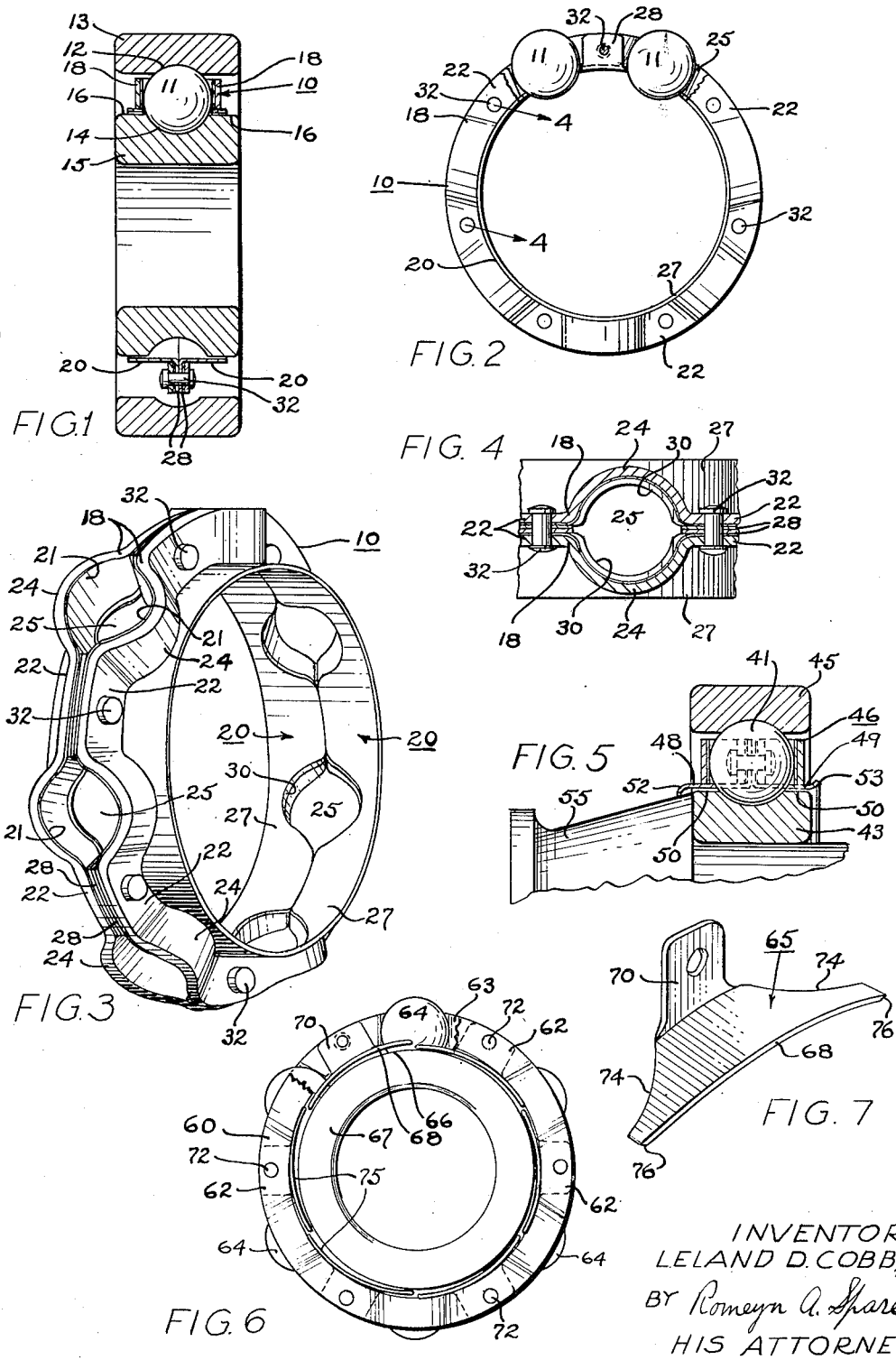
INVENTOR:
LELAND D. COBB,
BY Romeyn A. Spare
HIS ATTORNEY.

Patented Apr. 1, 1952

2,590,939

UNITED STATES PATENT OFFICE 2,590,939

SEPARATOR FOR ANTIFRICTION BEARINGS

Leland D. Cobb, Forestville, Conn., assignor to General Motors Corporation, Detroit, Mich., a corporation of Delaware Application September 3, 1949, Serial No. 113,989

15 Claims. (Cl. 308—201)

This invention relates to separators for spacing the rolling elements in antifriction bearings and particularly to a race ring guided separator adapted to extremely high speeds of ball travel.

Recently, there has been demand for antifriction bearings capable of supporting shafts at very high rotational speeds which are often as great as 130,000 rotations per minute. Heretofore, an inherent difficulty in providing such a high speed bearing resulted from the fact that the prior types of cages or separators, which spaced the rolling elements, could not stand these very high speeds of ball travel. The severe centrifugal forces set up at these high rotational speeds usually produced a condition of unbalance in these prior types of separators causing a pounding within the bearing and producing damaging friction of the separator against the rolling elements and/or against one or both of the race rings. This damaging friction caused rapid overheating of the bearing and usually resulted in bearing failure within a few minutes after it had reached this very high operating speed.

It is, therefore, an object of this invention to provide an improved separator of light weight and simple construction which will effectively hold rolling elements in spaced relation with very little friction even at high speeds of rotation.

Another object is to provide for an antifriction bearing an improved separator of simple construction which is radially guided by one of the race rings of the bearing.

A further object is to provide an improved separator easily formed from sheet materials and which will feed lubricant into and through a bearing.

A still further object is to provide an improved separator which at high speeds is radially positioned by the passage of air between the separator and one of the race rings of an antifriction bearing.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a cross sectional view through an antifriction bearing equipped with my improved separator;

Figure 2 is a side elevation of the separator partly broken away and showing two rolling elements in position;

Figure 3 is an enlarged perspective view of the separator;

Figure 4 is an enlarged fragmentary section taken along the line 4—4 of Figure 2;

Figure 5 is a fragmentary cross section showing another form of my separator mounted in an antifriction bearing;

Figure 6 is a side elevation of another form of my separator; and

Figure 7 is a perspective view of one of the guiding shoes shown in Figure 6.

The separator 10 is shown applied to rolling elements in the form of balls 11 running between an arcuate raceway 12 of an outer race ring 13 and an arcuate raceway 14 of an inner race ring 15. The race rings have the usual cylindrical lands at each side of their raceways and the lands 16 on the inner race ring in connection with an oil film are used to support the separator for frictionless rotation.

The separator comprises two pairs of rings made of different material and of such shape that every part can be readily stamped from sheet material prior to fastening. One pair of rings comprises mating annular body members 18 which are preferably sheet steel clad on adjacent sides with a non-ferrous material 21 as copper or a copper alloy integrally secured to the steel. These body members have mating flats or lands 22 alternating with arcuate portions 24 which cooperatively provide substantially cylindrical ball pockets 25. The other pair of rings comprises comparatively thin and light guiding elements 20, preferably made of hard copper or copper alloy such as brass or bronze which in the presence of lubricant has a low coefficient of friction against steel. In some large separators of this type it is preferable to make the guiding elements of sheet steel clad with a non-ferrous material such as a copper or copper alloy. Each guiding element has a cylindrical sleeve portion 27 and a series of flat securing lugs or ears 28 projecting therefrom in a common plane.

Each sleeve portion 27 telescopes with one body member 18, preferably fitting within and against it and each ear preferably extends outwardly for attachment to one of the flats or lands 22, preferably on the inside of the latter, so that mating ears abut flatwise against one another. Rivets 32 secure the mating flats and ears together. At the ball pockets the edges of the sleeve portions 27 are curved arcuately at 30 to closely conform to the balls below their equators without touching them, these edges projecting inwardly beyond the pocket lining 21 for added strength.

The sheet steel of the body members 18 provides sufficient rigidity to withstand the high temperatures and strong forces encountered with extremely high speeds of ball travel. The non-ferrous material 21 lining the pockets and integral with the body members has a much lower coefficient of friction against the steel balls than a corresponding steel surface would have. The sleeve portions 27 of the guiding elements closely surround the race ring lands 16 and ride on an interposed oil film and any included air. The material of which they are composed or their non-ferrous clad portion has a low coefficient of friction against the lubricated steel of the lands 16.

In Fig. 5, the balls 41 run between the race rings 43 and 45, and the separator 46 is similar to the separator 10 of Fig. 1. In this form, the cylindrical sleeve portions 48 and 49 are wider and extend beyond the race ring lands 50, the element 48 having an inturned lip 52 at the edge and the element 49 having an outturned lip or slinger 53. Fluid lubricant working under the lip, as along a conical shaft portion 55 supplied by a wick, is forced under the guiding elements and into and through the bearing the excess being thrown off by the slinger 53. At high speed of bearing operation, the lubricant will be atomized and produce a flow of cooling air along with it.

In Figs. 6 and 7, the mating body members 60 have flats or lands 62 alternating with the ball pockets 63 for balls 64 as in Fig. 3 but the guiding elements at each side of the separator are made as a circular series of independently tiltable shoes 65 arranged around and close to the lands 66 of the inner race ring 67. Each guiding element or shoe has an arcuate portion shaped as a cylindrical segment 68 with a projecting lug or ear 70 secured by rivets or pins 72 to the separator, the pins allowing a slight pivoting of the shoes. This pivotal movement is exaggerated in Fig. 6. The shoes have curved edges at 74 within the ball pockets to just clear the balls and their ends 76 are bevelled or rounded to facilitate the entrance of air and lubricant to the space under the shoes. The guiding elements or shoes are preferably made from hard copper, a copper alloy or from sheet steel clad on its inner face with a suitable non-ferrous material having a very low coefficient of friction against a lubricated steel surface. These inside faces initially and before tilting form an interrupted cylindrical surface whose diameter is slightly greater than the diameter of the lands 66.

When the separator attains its high speed of rotation, air will pocket under the advancing ends 76 of the guiding shoes and cause them to tilt and ride on an air pocket or step thus antifrictionally supporting the separator as indicated in Fig. 6. The air automatically controls the extent of tilting of the individual shoes depending on the speed of rotation. As the air rides under one end of a tilted shoe, it is compressed until it escapes and expands at the other end. This produces an air cushioned radial support for the separator and the flow of air cools the bearing to prevent overheating.

I claim:

1. In a separator for spacing rolling elements between a pair of race members, a pair of mating annular body members having pockets for the rolling elements, a pair of mating guiding elements each having an arcuate portion, the body members and the arcuate portions extending one within the other, an outwardly projecting lug on each arcuate portion, the body members having flats between the pockets, and means for fastening the lugs and the flats together.

2. In a separator for spacing rolling elements between a pair of race members, a pair of mating annular body members having pockets for the rolling elements, a pair of mating guiding elements each having a cylindrical portion, the body members and the cylindrical portions extending one within the other, a series of lugs projecting outwardly from each cylindrical portion, the body members having flat portions between the pockets, and means for fastening corresponding lugs on each guiding element to the corresponding flat portions.

3. In a separator for spacing rolling elements between a pair of race members, two pairs of mating rings arranged for rotation in unison, the rings of one pair being made of different material from the rings of said other pair, one pair of rings being made of steel and having pockets for the rolling elements, the other pair of mating rings being shaped to run in close proximity to one of the race members and composed of a non-ferrous material which has a low coefficient of friction with respect to said race member.

4. In a separator for spacing rolling elements between a pair of race members, two pairs of mating rings, the rings of one pair being composed of steel clad with a copper containing material and having pockets for the rolling elements, the other pair of mating rings being composed of thinner material and fitting within the other rings, and means for securing the four parts together.

5. In a separator for spacing rolling elements between a pair of race members, a pair of annular body members having pockets for the rolling elements, a pair of guiding elements formed separately from the body members, the guiding elements and the body members locating one within the other, a non-ferrous arcuate portion on each guiding element located in close relation to one of the race members, and means for securing the guiding elements to the body members between said pockets.

6. In a separator for spacing rolling elements between a pair of race rings, a pair of annular body members having pockets for the rolling elements, a pair of guiding elements formed separately from the body members, each guiding element having a cylindrical portion closely surrounding one of the race rings, a radially inwardly turned lip on one cylindrical portion, a radially outwardly turned lip on the other cylindrical portion, and means for securing each guiding element to the body members between said pockets.

7. In a separator for spacing rolling elements between a pair of race rings, a pair of annular body members having pockets for the rolling elements, a pair of guiding elements formed separately from the body members, each guiding element having a cylindrical portion closely surrounding one of the race rings, one of said cylindrical portions extending out beyond an end of said race ring, the other cylindrical portion terminating in an outwardly turned lip adjacent the other end of said race ring, outwardly projecting ears on each cylindrical portion, and means for securing the ears to the body members between said pockets.

8. In a separator for spacing rolling elements between a pair of race members, a pair of annular body members having pockets for the rolling elements, a plurality of spaced arcuate guiding shoes in close proximity to one of the race members, the guiding shoes and the body members being located one within the other, and means for pivotally securing the guiding shoes to the body members.

9. In a separator for spacing rolling elements between a pair of race members, a pair of annular body members having pockets for the rolling elements, a plurality of circumferentially spaced guiding shoes, each guiding shoe having an arcuate portion in close proximity to one of the race members, the guiding shoes and the body members locating one within the other, a projecting lug on each shoe, and means pivotally fastening said projecting lugs to the body members between said pockets.

10. In a separator for spacing rolling elements between a pair of race members, a pair of annular body members having pockets for the rolling elements, a plurality of spaced guiding shoes within the body members, said shoes having circumferentially spaced arcuate portions cooperatively surrounding and closely spaced to one of the race members, and means on the body members providing for individual tiltable shoe movements so that at high speed separator rotation air will pocket between the arcuate portions and said race member and support the separator on an air step.

11. In a separator for spacing rolling elements between a pair of race members one of which has a cylindrical land, a pair of annular body members having pockets for the rolling elements, a plurality of circumferentially spaced guiding shoes, each shoe having an arcuate portion in close proximity to said cylindrical land, means pivotally supporting the shoes between said pockets to provide for individual tiltable movement of said shoes whereby at high speeds of separator rotation air will pocket between the shoes and the cylindrical land and support said separator.

12. In a separator for spacing rolling elements between a pair of race members, a pair of annular body members having pockets for the rolling elements, a plurality of circumferentially spaced guiding shoes, the guiding shoes and the body members being received one within the other, an arcuate portion on each shoe projecting inwardly of a plurality of said pockets and in close proximity to one of the race members, each arcuate portion having in one edge a plurality of curved portions for receiving the rolling elements, an ear extending outwardly from each arcuate portion, and means extending through the ears and through the body members between said pockets to pivotally mount the shoes for individual tiltable movement.

13. In a separator for spacing rolling elements between a pair of race members, a pair of cooperating annular body members having peripherally spaced cooperating pockets for rolling elements, an annular guiding element engageable with one of the race members, said guiding element being formed independently of the body members and slidably interfitting with one of the body members, peripherally spaced lugs on the annular guiding element, and fastening members securing said lugs to both of the body members between said pockets.

14. In a separator for spacing rolling elements between a pair of race members, a pair of mating annular body members having cooperating peripherally spaced pockets for the rolling elements, interengaging flat portions on the body members between said pockets, an annular guiding element formed independently of the body members and engageable with one of the race members, the guiding element and one of the body members slidably interfitting one within the other, peripherally spaced outwardly extending lugs on the annular guiding element and fastening members holding said flat portions and lugs together.

15. In a separator for spacing rolling elements between a pair of race members, a pair of annular body members cooperatively providing spaced pockets for the rolling elements, a pair of mating guiding elements formed independently of said body members, a cylindrical portion on each guiding element, the body members and said cylindrical portions slidably interfitting one within the other, peripherally spaced radially projecting lugs on each guiding element, and means securing the spaced lugs to the body members between said pockets.

LELAND D. COBB.

REFERENCES CITED

The following references are of record in the file of this patent:

UNITED STATES PATENTS

| Number | Name | Date |
| --- | --- | --- |
| 955,286 | Reibe | Apr. 19, 1910 |
| 1,742,418 | Schubert | Jan. 7, 1930 |
| 1,928,352 | Goodell | Sept. 26, 1933 |